Figure 1:
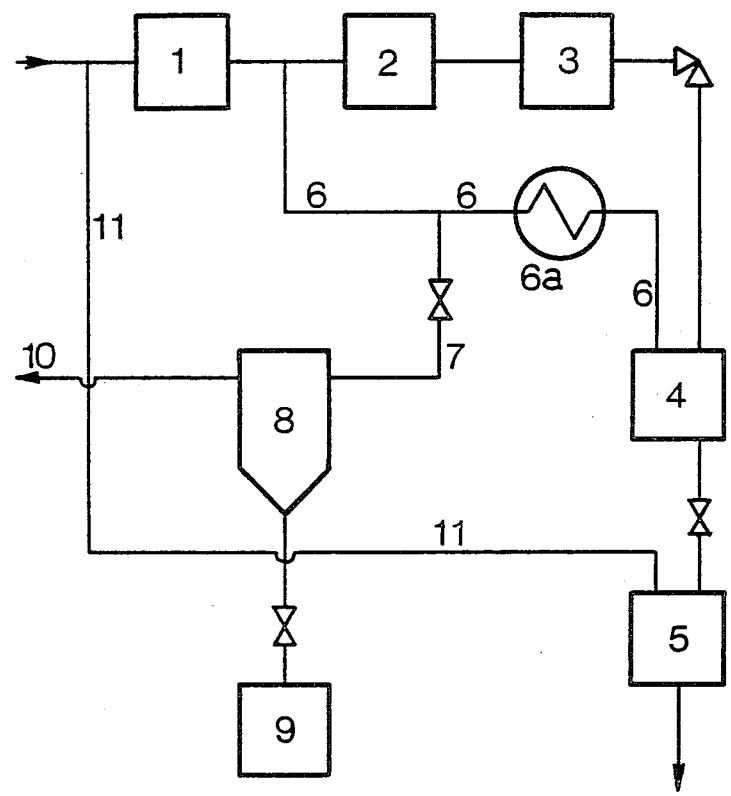

United States Patent [19]

Pfleger et al.

[11] 4,260,722

[45] Apr. 7, 1981

[54] PRODUCTION OF ETHYLENE COPOLYMERS

[75] Inventors: Klaus Pfleger; Wieland Zacher; Klaus Boettcher, all of Wesseling; Ronald Skorczyk, Bonn; Oskar Buechner, Dudenhofen; Franz G. Mietzner, Ludwigshafen, all of Fed. Rep. of Germany

[73] Assignee: BASF Aktiengesellschaft, Fed. Rep. of Germany

[21] Appl. No.: 97,838

[22] Filed: Nov. 27, 1979

[30] Foreign Application Priority Data

Dec. 15, 1978 [DE] Fed. Rep. of Germany ....... 2854151

[51] Int. Cl.$^3$ ................................................. C08F 2/02
[52] U.S. Cl. .................................... 526/68; 526/235; 526/331
[58] Field of Search ........................................... 526/68

[56] References Cited

U.S. PATENT DOCUMENTS

| 3,184,444 | 5/1965 | Eilbracht et al. | 526/68 |
| 3,336,281 | 8/1967 | Eilbracht et al. | 260/94.9 |

Primary Examiner—Stanford M. Levin
Attorney, Agent, or Firm—Keil & Witherspoon

[57] ABSTRACT

A process for the continuous production of an ethylene copolymer by compressing a mixture of ethylene and comonomer in a pre-compressor and a post-compressor, copolymerizing the mixture in a polymerization zone at a high temperature and high pressure, transferring the reaction mixture into a high pressure product isolation zone, from there into a low pressure product isolation zone and thereafter into a discharge extruder, and recycling the greater part of the unconverted monomer into the polymerization process and passing a small part of the unconverted gas into a low temperature isolation zone, in which process a small part of the gas recycled from the high pressure product isolation zone is passed into the low temperature isolation zone, which is preferably under a pressure of from 10 to 30 bar and at from $-10°$ to $-50°$ C., and all the gas taken off the low pressure product isolation zone is fed to the pre-compressor. Using the novel process, the separating-off of the comonomer which has remained unconverted in the polymerization process can be improved.

2 Claims, 2 Drawing Figures

PRODUCTION OF ETHYLENE COPOLYMERS

The present invention relates to a process for the continuous production of ethylene copolymers.

In this process, ethylene copolymers are obtained by compressing a mixture of ethylene and a comonomer copolymerizable with ethylene stepwise in a precompressor and a post-compressor, copolymerizing the mixture in a polymerization zone under pressure of from 1,500 to 5,000 bar at from 150° to 350° C. in the presence of a free radical polymerization initiator, transferring the resulting reaction mixture into a high pressure product isolation zone which is under a pressure of from 100 to 500 bar and at from 150° to 250° C., then into a downstream low pressure product isolation zone, which is under a pressure of from 1 to 10 bar and at from 150° to 250° C., and thereafter into a discharge extruder, and recycling the greater part of the unconverted gas, consisting of ethylene and comonomer, from the high pressure product isolation zone and the low pressure product isolation zone into the polymerization process, whilst passing a small part of the unconverted gas into a low temperature isolation zone.

In processes of this type measures are needed to isolate comonomer which has remained unconverted during the copolymerization from the ethylene recycle streams, before these are returned to the polymerization process to undergo further polymerization, or are used for other purposes. Usually, in such processes, the unconverted gas is recycled in two ethylene recycle streams, one stream originating from the high pressure product isolation zone (the high pressure product separator) and being referred to as high pressure recycle gas and the other originating from the low pressure product isolation zone (low pressure product separator) and being referred to as low pressure recycle gas. The recycling of gas in the high pressure polymerization of ethylene is generally known and is described, for example, in U.S. Pat. No. 3,117,953, in Ullmann's Encyclopädie der technischen Chemie, Verlag Urban & Schwarzenberg, Munich and Berlin, 1963, 3rd edition, Volume 14, pages 139–145, and in the Kunststoffhandbuch, Verlag Carl Hanser, Munich 1969, Volume IV, pages 39–52.

Using the conventional processes, the unconverted comonomer is isolated from the recycle gas of the plant by letting down part or all of the gas of the high-pressure loop, which is operated under pressures of from 100 to 500 bar. During this expansion, the gas mixture cools to below 0° C., and the comonomers in question separate out more or less completely, in accordance with their vapor pressure. The greater part, or all, of the gas mixture present in the high-pressure loop is expanded into the low temperature isolation zone (low temperature separator). The entire amount of gas coming from the low pressure product isolation zone is also passed into this low temperature isolation zone. The low temperature isolation zones are well known per se and are descirbed, for example, in German Pat. No. 954,921, German Pat. No. 1,445,229 and U.S. Pat. No. 3,336,281.

The conventional processes employing the principle described have the disadvantage that the isolation of the unconverted comonomer in the low temperature separator must be carried out at relatively low pressures and is therefore unsatisfactory. In the conventional processes, the pressure in the low pressure product separator cannot be kept above 5 bar, since otherwise an excessive amount of gas passes into the extruder with the polymer melt and interferes with the extrusion/granulation of the copolymer. The content of gas in the product melt and in the granulated product in general increases substantially with increasing pressure in the low pressure product separator. The ethylene contained in the polymer melt can be removed in devolatilizing extruders, which is only possible at substantial expense; if a devolatilizing extruder is not employed, the ethylene-containing granules can be devolatilized by exposing the product to air or nitrogen in silos, but this results in a substantial amount of ethylene being discharged into the atmosphere.

It is an object of the present invention to modify the process described at the outset so as to achieve improved isolation of the comonomer not converted in the polymerization process, leaving only small amounts of comonomer in the off-gas and only a small amount of gas in the copolymer coming from the low pressure product isolation zone.

We have found that this object is achieved, according to the invention, if only a small part of the gas recycled from the high pressure product isolation zone is introduced into the low temperature isolation zone, and all the gas taken off the low pressure product isolation zone is fed to the pre-compressor.

Preferably, the gas passed into the low temperature isolation zone is kept at a pressure of from 10 to 30 bar and at from $-10°$ to $-50°$ C.

For the purposes of the invention, ethylene copolymers are those copolymers of ethylene which can be prepared under the stated temperature and pressure conditions, and which contain up to 50 percent by weight of comonomers as copolymerized units and have a melt index of form 0.1 to 150 g/10 min, determined in accordance with ASTM-D-1238-65 T at 190° C. under a load of 2.16 kg, and a density of from 0.890 to 0.934 g/cm$^3$, measured according to DIN 53,479.

For the purposes of the invention, copolymers of ethylene means the ethylene copolymers obtainable under pressures of from 1,500 to 5,000 bar and at from 150° to 350° C. Any polymerization initiator and chain transfer agent conventionally used for high pressure copolymerization of ethylene may be employed in the present process.

Suitable comonomers copolymerizable with ethylene are all compounds which are copolymerizable with ethylene at the stated temperatures and pressures. Examples of such comonomers are vinyl exters of $C_2$–$C_4$-alkanecarboxylic acids, eg. vinyl acetate or vinyl propionate, $C_2$–$C_4$-alkyl esters of a $C_3$–$C_4$-alkenecarboxylic acid, eg. n-butyl or tert.-butyl acrylate; acrylonitrile; acrylamide; $C_2$–$C_4$-alkenecarboxylic acids, eg. acrylic acid; and vinyl ethers derived from alkenes of 3 to 8 carbon atoms. Advantageous initiators are oxygen, peroxides, eg. benzoyl peroxide, and azo compounds, eg. azo-bis-isobutyronitrile.

Before the mixture of ethylene and comonomers is introduced into the polymerization zone, it is compressed in a precompressor to 250–350 bar and then brought to the polymerization pressure in a post-compressor. Usually, two units arranged in series, as described in Ullmann's Encyklopädie der technischen Chemie (1963), Volume 14, page 140–141, Verlag Urban & Schwarzenberg, Munich and Berlin, are employed for this multi-stage compression to the desired polymerization pressure.

The process can be carried out with the conventional continuously operated high pressure polymerization systems. Polymerization zones for the purposes of the invention are the conventional tubular reactors and stirred autoclaves. Tubular reactors are tubular polymerization vessels which have a length: diameter ratio of the pressure-resistant tubes of from 10,000: 1 to 60,000: 1. Autoclave reactors are pressure-resistant vessels which have a length: diameter ratio of from 30: 1 to 2.5: 1. In order to permit good mixing of the reaction mixture and hence good distribution of the heat generated, stirrers are fitted into the autoclaves. Information on processes in which tubular reactors are employed is to be found, for example, in Ullmann's EncyklopUM/a/ die der technischen Chemie, 1963, 3rd edition, Volume 14, pages 137–148.

Following the polymerization, the reaction mixture is passed into a high pressure product isolation zone or high pressure product separator, which is under a pressure of from 100 to 500 bar, preferably from 250 to 350 bar, and at from 150° to 250° C. In this high pressure product separator, the ethylene copolymer produced in the reactor is separated from unpolymerized monomers. From the high pressure product separator, the copolymer is passed into the low pressure product isolation zone or low pressure product separator. According to the process of the invention, the greater part of the unconverted gas mixture, consisting of ethylene and comonomers, coming from the high pressure isolation zone is passed through the post-compressor, where it is re-compressed to the reaction pressure, and is then passed into the polymerization zone, whilst a small part, namely 0.5–10 percent by weight, preferably 1–3 percent by weight, of the gas recycled from the high pressure isolation zone is passed into the low temperature isolation zone.

According to the process of the invention, all of the gas taken off the low pressure isolation zone and consisting of ethylene and comonomers is passed to the pre-compressor and used for subsequent polymerization. By this means, the pressure in the low pressure separator can be kept very low, preferably at from 1 to 1.5 bar. There is no connection between the recycle gas streams of the high-pressure loop and the low-pressure loop.

From the low pressure product separator, the copolymer obtained is passed in the conventional manner into a discharge extruder, and is extruded and granulated.

According to the invention, the gas mixture passed from the high pressure isolation zone into the low temperature zone is kept at a pressure of from 10 to 30 bar and at −10° to −50° C.

The process according to the invention has the advantage that the amount of gas in the granulated product is reduced as a result of the reduction in pressure which can be effected in the low pressure product separator. This results in a substantial reduction in ethylene emission. The off-gas, which originates exclusively from the high-pressure loop and is passed through the low temperature separator, retains only very small amounts of comonomers.

The process according to the invention is described in more detail in the Examples which follow.

EXAMPLE

The process according to the invention will be described in relation to the appended FIG. 1.

A tubular reactor (3) is fed with a mixture, which has been compressed stepwise to 2,100 bar in a pre-compressor (1) and post-compressor (2) and which provides, per hour, 9,460 kg of ethylene, 1,415 kg of vinyl acetate and 15 moles of oxygen per million moles of ethylene. In the reaction zone (3), the reaction mixture reaches a peak temperature of 305° C.; the heat of reaction which is liberated is conducted away by means of water under pressure. From the reactor (3), the product passes into the high pressure product separator (4), which is under a pressure of 300 bar and at 220° C., and from there into the low pressure product separator (5), which is operated under a pressure of 1.5 bar and at 210° C. Per hour, 1,780 kg of a homogeneous ethylene copolymer, having a density of 0.345 g/cm$^3$ and a melt index of 4.15 g/10 min., and containing 13.8 percent by weight of vinyl acetate as copolymerized units, are obtained.

From the high-pressure loop (6), 120 kg per hour of gas are let down via a connecting line (7) into the low temperature separator (8); the greater part (8,715 kg of the gas) from the high pressure product separator (4) is passed through a cooling system (6a) and via the line (6) to the post-compressor (2). The vinyl acetate which has remained unconverted in the reactor (3) separates out on letting down the 120 kg of gas from the high-pressure loop (6), wich is operated under 300 bar, in the low temperature separator (8), which is kept under a pressure of 20 bar. 15.4 kg of vinyl acetate per hour separate out at −25° C. in the separator (8). The comonomer which has separated out is discharged continuously into a collector-separator (9).

The ethylene which leaves the low temperature separator (8) and has been substantially freed from vinyl acetate is discharged from the process as off-gas via the line (10). The 104.6 kg of off-gas discharged per hour contain 0.14 kg of vinyl acetate; this corresponds to a vinyl acetate content of 0.13 percent by weight in the off-gas.

The entire amount of gas, which amounts to 380 kg per hour and comes from the low pressure product separator (5), is passed to the pre-compressor (1) via the line (11).

COMPARATIVE EXAMPLE

Figure 2:
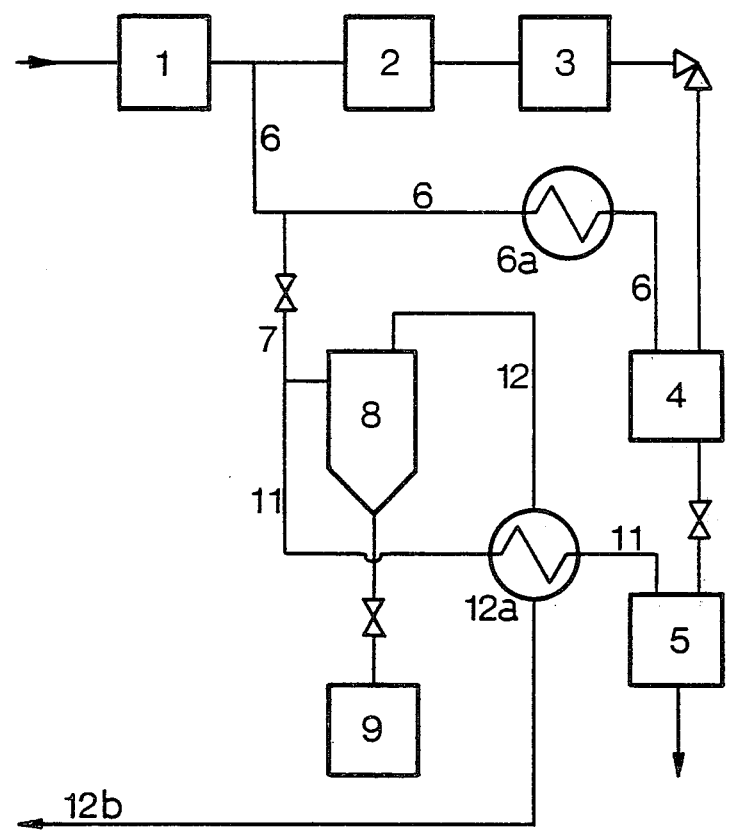

The prior art process will be described in relation to the appended FIG. 2.

As in the case of the Example according to the invention, a mixture which has been compressed stepwise to 2,100 bar in a pre-compressor (1) and post-compressor (2) and comprises 9,460 kg of ethylene, 1,415 kg of vinyl acetate and 15 moles of oxygen per million moles of ethylene, is fed to a tubular reactor (3). The conditions in the reactor (3) and the high pressure product separator (4) are the same as those described in the Example according to the invention.

The low pressure product separator (5) is at 210° C. and under a pressure of 4 bar. 1,780 kg of a homogeneous ethylene copolymer, having a density of 0.9345 g/cm$^3$ and a melt index of 5.15 g/10 min., and containing 13.5 percent by weight of vinyl acetate as copolymerized units, are obtained.

The vinyl acetate which has not been converted in the reactor (4) is isolated as follows: after having passed through the cooling system (6a), a part, namely 1.134 kg, of the gas mixture present in the high-pressure loop (6) under 300 bar is let down via line (7) into the low temperature separator (8), whilst the remainder of the recycle gas remains in the high-pressure loop (6) and is passed to the post-compressor (2). The entire amount of gas, namely 380 kg, from the low pressure product separator (5) is also passed into the low temperature separator (8) through the line (11) after having passed through the cooling system (12a). The amount of vinyl acetate obtained in this low temperature separator (8) under a pressure of 3 bar and at −25° C. is 183.8 kg. The ethylene leaving the low temperature separator (8) still contains 9.24 kg of vinyl acetate and must be discharged from the process as off-gas through the line (12/12b); this corresponds to a vinyl acetate content of 0.7 percent by weight in the off-gas. The vinyl acetate obtained in the low temperature separator (8) cannot be re-used for copolymerization without prior purification, since it is excessively contaminated. 443.34 kg of fresh vinyl acetate must be introduced into the process. All the quantitative data relate to a period of 1 hour.

COMPARISON

|  | Amount of VAc separated off | Amount of VAc contained in the off-gas | Ethylene contained in the freshly granulated copolymer |
| --- | --- | --- | --- |
| Example according to the invention | 15.4 kg/h | 0.14 kg/h | 580 cm³/kg |
| Comparative Example | 193.8 kg/h | 9.24 kg/h | 1,650 cm³/kg |

VAc = vinyl acetate

The quantitative data concerning VAc relate to a period of 1 hour.

We claim:

1. A process for the continuous production of ethylene copolymers which contain up to 50 percent by weight of comonomers as copolymerized units by compressing a mixture of ethylene and a comonomer copolymerizable with ethylene stepwise in a pre-compressor and a post-compressor, copolymerizing the mixture in a polymerization zone under pressures of from 1,500 to 5,000 bar at from 150° to 350° C. in the presence of a free radical polymerization initiator, transferring the resulting reaction mixture into a high pressure product isolation zone which is under a pressure of from 100 to 500 bar and at from 150° to 250° C., then into a downstream low pressure product isolation zone, which is under a pressure of from 1 to 10 bar and at from 150° to 250° C., and thereafter into a discharge extruder, and recycling the greater part of the unconverted gas, consisting of ethylene and comonomer, from the high pressure product isolation zone and the low pressure product isolation zone into the polymerization process, whilst passing a small part of the unconverted gas into a low temperature isolation zone, in which process a small part of the gas recycled from the high pressure product isolation zone is passed into the low temperature isolation zone from where it is removed from the process as an off-gas and all the gas taken off the low pressure product isolation zone is fed to the pre-compressor.

2. A process as claimed in claim 1, wherein the gas passed into the low temperature isolation zone is kept under a pressure of from 10 to 30 bar and at from −10° to −50° C.

* * * * *